Patented Dec. 8, 1942

2,304,239

UNITED STATES PATENT OFFICE 2,304,239

PRODUCTION OF PRIMARY ALKYL CHLORIDES

Hyym E. Buc, Roselle, N. J., assignor to Standard Oil Development Company, a corporation of Delaware No Drawing. Application October 21, 1939, Serial No. 300,567

5 Claims. (Cl. 260—658)

This invention relates to the manufacture of alkyl chlorides and olefin hydrocarbons, and has particular reference to a convenient and economical process by which a primary alkyl monochloride and an olefin may be produced in good yields in the same reaction.

In the manufacture of secondary aliphatic alcohols by the hydration of normal olefin hydrocarbons, such as those contained in the amylene fraction of products obtained in the cracking of petroleum oils, a loss is experienced owing to the presence of a large proportion of tertiary base olefins, i. e., olefins having the structure

where R and R' and alkyl radicals. These tertiary base olefins tend to copolymerize with the normal olefins to form copolymers, with corresponding loss of normal olefins.

A convenient method of removing the tertiary base olefins from mixtures with primary and secondary base olefins, such as are found in petroleum fractions, obtained, for example, in the cracking, dehydrogenation or isomerization of petroleum oils, consists in treating the olefin fraction, e. g., the amylene fraction, with commercial hydrochloric acid at normal temperature, whereby the tertiary base olefins are selectively isolated as tertiary alkyl chlorides.

It is an object of this invention to provide an economical means for converting the by-product tertiary alkyl chlorides of the above-described process into useful products. It is a more general object of the invention to provide a means for converting secondary and tertiary alkyl chlorides into primary alkyl chlorides, and primary alkyl chlorides into other primary alkyl chlorides. It is a further object to provide a convenient method for producing both primary alkyl halides and olefins, including tertiary base olefins, in pure form and in comparatively high yields in the same reaction. Other objects will appear in the description of the invention which follows.

By the process of the present invention, if a tertiary alkyl chloride, i. e., a chloride containing a single chlorine atom attached to a tertiary carbon atom, is reacted with a primary aliphatic alcohol, there is produced a primary alkyl chloride corresponding to the alcohol used. The invention includes also, in the case of reaction with methyl alcohol, the production of a primary alkyl chloride, i. e., methyl chloride, by reaction of the alcohol with a primary, a secondary or a tertiary alkyl chloride. The above reactions are preferably conducted in the presence of a catalyst and at a temperature below that which would cause any substantial decomposition of the chloride formed.

The process is particularly adapted to the reaction of a tertiary alkyl chloride containing not more than ten carbon atoms with a primary aliphatic alcohol containing not more than four carbon atoms, whereby a primary alkyl chloride is formed. Temperatures of 150 to 300° C. and atmospheric pressure are especially suitable for such a reaction.

The catalyst employed in the reactions of this invention is preferably a difficulty volatile catalyst, which has no polymerizing action on the reactants or the reaction products, and is preferably carried by an inert medium, such as kieselguhr or charcoal. Suitable catalysts are phosphoric and boric acids and difficulty volatile metal halides, such as barium chloride or bismuth trichloride.

As illustrations of the reactions contemplated by the present invention, the following may be mentioned: (1) the reaction of tertiary amyl chloride with methyl alcohol to form methyl chloride; (2) the reaction of primary amyl chloride with methyl alcohol to form methyl chloride; (3) the reaction of secondary amyl chloride with methyl alcohol to form methyl chloride; (4) the reaction of tertiary amyl chloride with ethyl alcohol to form ethyl chloride. The invention also includes reacting mixtures of chlorides, such as those obtained by treating with hydrochloric acid cracked petroleum fractions containing mixtures of tertiary base olefins, with a primary aliphatic alcohol to form a mixture of alkyl chlorides. In most cases, such as in the reaction of tertiary amyl chloride with methyl alcohol, the reaction products consist chiefly of a primary alkyl chloride and the olefin corresponding to the initial alkyl chloride. The reaction in the case mentioned may be represented as follows:

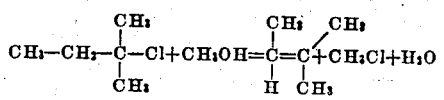

This invention, as shown above, provides a means of producing both a primary alkyl chloride and an olefin in the same reaction.

The process of the invention is illustrated by the following examples:

Example 1

Tertiary amyl chloride, formed by the reaction of hydrochloric acid with trimethylethylene contained in an amylene fraction obtained from the distillation of cracked petroleum products, and commercial methyl alcohol are passed in the form of vapors through a reaction zone maintained at 175–225° C. in the presence of a catalyst consisting of phosphoric acid impregnated on kieselguhr. An excess of 25–50% of alcohol over the theoretical amount for equimolecular proportions of chloride and alcohol is used, and the reaction mixture is fed to the reaction zone at the rate of 1 to 5 volumes per volume of catalyst per hour. The resulting reaction mixture, consisting of methyl chloride, trimethylethylene, methyl alcohol, hydrochloric acid and water, is condensed. The condensate separates into two layers, a water-alcohol-acid layer and a hydrocarbon-methyl chloride layer. The latter is drawn off and its two components are separated by any convenient method, such as distillation. In this reaction yields of 80% of methyl chloride and trimethylethylene, based on the amount of tertiary amyl chloride used, have been obtained.

The methyl chloride obtained in the above example is useful in dry cleaning, in the manufacture of dyes, as a solvent for fats and oils, as a methylating agent, etc. The trimethylethylene is useful, for example, in the preparation of isoprene or tertiary amyl phenol, also in the production of high octane number motor fuels by polymerization.

Example 2

Ten molecular proportions of tertiary amyl chloride and 13 molecular proportions of ethyl alcohol are passed through a reaction zone maintained at 170–180° C., at a feed rate of approximately 0.5 volumes per volume of catalyst per hour in the presence of a catalyst consisting of phosphoric acid impregnated on kieselguhr. The reaction products are collected in a series of cooled condensers; however, most of the ethylene, formed by degradation of the ethyl alcohol, is separately removed by any suitable means, e. g., by absorption. The product of condensation separates into two layers, one containing ethyl chloride and trimethylethylene, the other containing water, hydrochloric acid and an inappreciable amount of ethyl alcohol. The ethyl chloride may be separated from the trimethylethylene by any convenient means, such as distillation. Yields of 60–70% of ethyl chloride and trimethylethylene, based on the amount of alcohol charged, have been obtained by the above method.

The invention is not to be considered as limited to any theory of the process herein discussed or by any examples of the application of the process, which are given by way of illustration only, but is limited solely by the terms of the appended claims.

I claim:

1. A process of producing ethyl chloride which comprises reacting tertiary amyl chloride with ethyl alcohol in the absence of water.

2. A method of producing a primary alkyl chloride which comprises reacting a tertiary alkyl chloride in the absence of water with a primary aliphatic alcohol containing more than one carbon atom.

3. A method of producing ethyl chloride which comprises reacting a tertiary alkyl chloride with ethyl alcohol in the absence of water.

4. A method of producing a primary alkyl chloride which comprises reacting a tertiary alkyl chloride containing not more than ten carbon atoms with a primary aliphatic alcohol containing more than one but not more than four carbon atoms at a temperature of about 150° to 300° C. under atmospheric pressure in the absence of water.

5. A method of producing ethyl chloride which comprises reacting tertiary amyl chloride with ethyl alcohol at about 170° to about 180° C. in the presence of phosphoric acid as a catalyst and in the absence of water.

HYYM E. BUC.